United States Patent
Michalopoulos et al.

(10) Patent No.: US 11,146,993 B2
(45) Date of Patent: Oct. 12, 2021

(54) HANDOVER WITH POSTPONED PATH SWITCH

(71) Applicant: Nokia Technologies Oy, Espoo (FI)

(72) Inventors: Diomidis Michalopoulos, Munich (DE); Ingo Viering, Kaspar-Spaet-Strasse (DE); Andreas Maeder, Würzburg (DE)

(73) Assignee: Nokia Technologies Oy, Espoo (FI)

( * ) Notice: Subject to any disclaimer, the term of this patent is extended or adjusted under 35 U.S.C. 154(b) by 563 days.

(21) Appl. No.: 15/776,160

(22) PCT Filed: Dec. 7, 2015

(86) PCT No.: PCT/IB2015/059424
§ 371 (c)(1),
(2) Date: May 15, 2018

(87) PCT Pub. No.: WO2017/089872
PCT Pub. Date: Jun. 1, 2017

(65) Prior Publication Data
US 2020/0296633 A1    Sep. 17, 2020

(30) Foreign Application Priority Data
Nov. 27, 2015 (GR) ............................. 20150100515

(51) Int. Cl.
*H04W 4/00*    (2018.01)
*H04W 36/00*    (2009.01)
(Continued)

(52) U.S. Cl.
CPC ....... *H04W 36/0016* (2013.01); *H04W 36/08* (2013.01); *H04W 40/36* (2013.01); *H04W 92/045* (2013.01); *H04W 92/20* (2013.01)

(58) Field of Classification Search
CPC ..... H04W 36/08; H04W 36/14; H04W 84/12; H04W 36/0055; H04W 36/0022; H04W 24/10; H04W 36/0083
See application file for complete search history.

(56) References Cited

U.S. PATENT DOCUMENTS

| | | | |
|---|---|---|---|
| 2009/0061876 A1* | 3/2009 | Ho ........................ | H04W 99/00 455/436 |
| 2010/0027497 A1* | 2/2010 | Pelletier ................ | H04W 28/06 370/329 |

(Continued)

FOREIGN PATENT DOCUMENTS

| | | |
|---|---|---|
| WO | 2012/037958 A1 | 3/2012 |
| WO | 2014/005653 A1 | 1/2014 |
| WO | 2014/168549 A1 | 10/2014 |

OTHER PUBLICATIONS

Office action received for corresponding European Patent Application No. 15909189.1, dated Nov. 12, 2019, 5 pages.
(Continued)

*Primary Examiner* — Atique Ahmed
(74) *Attorney, Agent, or Firm* — Harrington & Smith

(57) ABSTRACT

An exemplary embodiment provides an apparatus comprising at least one processor and at least one memory including computer program code, wherein the at least one memory and the computer program code are configured, with the at least one processor, to cause said apparatus to determine that a path switch can be initiated during a handover of a user equipment from a first access node to a second access node, determine at least one condition for initiating the path switch, postpone the initiation of the path switch until the at least one condition has been met, and in response to determining that the at least one condition has been met, indicate the initiation of the path switch to the first access node or the second access node.

13 Claims, 5 Drawing Sheets

(51) Int. Cl.
*H04W 36/08* (2009.01)
*H04W 40/36* (2009.01)
*H04W 92/04* (2009.01)
*H04W 92/20* (2009.01)

(56) References Cited

U.S. PATENT DOCUMENTS

| | | | | |
|---|---|---|---|---|
| 2010/0177736 | A1* | 7/2010 | Wang | H04L 1/1642 370/331 |
| 2011/0044285 | A1 | 2/2011 | Jang et al. | |
| 2012/0142352 | A1* | 6/2012 | Zhang | H04W 36/0072 455/436 |
| 2012/0155431 | A1* | 6/2012 | Kang | H04L 47/621 370/331 |
| 2012/0252458 | A1* | 10/2012 | Ohnishi | H04L 43/0882 455/436 |
| 2013/0183971 | A1* | 7/2013 | Tamaki | H04W 36/0061 455/436 |
| 2013/0336174 | A1* | 12/2013 | Rubin | H04L 1/0027 370/280 |
| 2015/0004984 | A1* | 1/2015 | Kim | H04W 4/70 455/440 |
| 2015/0131615 | A1* | 5/2015 | Miklos | H04W 36/0055 370/331 |
| 2015/0201360 | A1* | 7/2015 | Ray Chaudhuri | H04W 36/30 455/436 |

OTHER PUBLICATIONS

Extended European Search Report received for corresponding European Patent Application No. 15909189.1, dated Mar. 22, 2019, 10 pages.

"Avoiding Bearer Release Confliction upon E-UTRAN<->HRPD Handover", 3GPP TSG SA WG2 Meeting #64, TD S2-082226, Agenda Item: 8.4.7, Huawei, Apr. 7-11, 2008, 3 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300, V12.5.0, Mar. 2015, pp. 1-251.

"3rd Generation Partnership Project; Technical Specification Group Radio Access Network; Radio Resource Control (RRC); Protocol specification (Release 12)", 3GPP TS 25.331, V12.6.0, Jun. 2015, pp. 1-2226.

"3rd Generation Partnership Project; Technical Specification Group Radio Access Network; Coordinated multi-point operation for LTE with non-ideal backhaul (Release 12)", 3GPP TR 36.874, V12.0.0, Dec. 2013, pp. 1-44.

"3rd Generation Partnership Project; Technical Specification Group Radio Access Network; Radio resource management strategies (Release 7)", 3GPP TR 25.922, V7.0.0, Dec. 2006, pp. 1-92.

International Search Report and Written Opinion received for corresponding Patent Cooperation Treaty Application No. PCT/IB2015/059424, dated Sep. 5, 2016, 15 pages.

* cited by examiner

HANDOVER WITH POSTPONED PATH SWITCH

RELATED APPLICATION

This application was originally filed as Patent Cooperation Treaty Application No. PCT/IB2015/059424 filed Dec. 7, 2015 which claims priority benefit to Greece Patent Application No. 20150100515, filed Nov. 27, 2015.

TECHNICAL FIELD

The present application relates generally to wireless communication systems, methods, devices and computer programs and, more specifically, to handover between network and mobile terminals.

BACKGROUND

The process of handover refers to a series of actions taken at the network and the mobile terminal, also known as user equipment (UE), when the latter moves from the coverage of one access node, also known as base station (BS) or Node B (NB) or evolved Node B (eNB) or access point (AP), to another access node.

Various handover procedures are used in different wireless communications systems. And, some of these wireless communications systems are under different technology standards. One cellular network system, referred to as the third generation partnership project (3GPP) work item on the Long Term Evolution (LTE), is widely used for wireless communications. Another cellular network system referred to as the $5^{th}$ generation mobile networks or the $5^{th}$ generation wireless systems (5G) is known to be the next major phase of mobile telecommunications standards beyond LTE or LTE Advanced (LTE-A) standards. Another wireless network system including handover is Worldwide Interoperability for Microwave Access (WiMAX) standards defined network system. One more example of the wireless networks including handover is IEEE 802.11 standardized wireless system, also known as WiFi system.

A fundamental desired feature of mobile communications is uniterrrupted service from access nodes to mobile terminals, despite the change of the location of the mobile terminals. In other words, one of the goals in designing a handover process is smoothening the transition effects when mobile terminals move between the coverage of different access nodes.

A handover should occur as seamless as possible, in the sense that the the data exchange between the mobile terminal and the access nodes should continue as uninterrupted as possible regardless of changes between the serving access nodes. Nevertheless, depending on the radio access technology, there may be a non-negligible delay in the data packet delivery time due to the connection interruption occurring each time when a handover takes place. Depending on the overlaying application and implementations, the delay caused by the physical interruption may or may not cause negative impact to the end-to-end service performance. For instance, the handover in mobile telephony is robust, since the resulting delay time is smaller than the hearing time resolution of the human ear. However, some future applications may be susceptible to more critical interruption requirements, which would result in higher sensitivity to handovers. In particular, future communication systems are anticipated to accommodate numerous machine-type communication applications. An example of such communication system is communication setup representing automotive applications assisting the driver and/or supporting autonomous driving or self-driving automobile. In such applications, data packets are highly sensitive to delay, because even the smallest interruption may lead to fatal accidents. Thus, future networks need to adopt an alternative approach towards handover, which aims at limiting such transition effects to the minimum extent.

In addition to the delay in data packet delivery, another problem associated with handover is so-called connection "ping-pong", also known as "ping-pong" effect or "ping-pong" instance, between access nodes with overlapping coverage. This refers to cases where consecutive handovers occur between two neighboring access nodes, meaning the wireless service to a mobile terminal switching from one access node to another, and vice versa. The connection "ping-pong" is not desired due to the large signalling overhead that it creates. And, it usually occurs when the channels between the mobile and the access nodes are approximately equally strong but rapidly fluctuating.

In future mobile systems, where the use of higher frequencies such as in millimetre-wave (mmW) frequencies, connection "ping-pong" is anticipated, and occurrence of the "ping-pong" instances is expected to increase, due to the fact that the mmW frequencies are more susceptible to sudden environmental change such as traffic for a moving vehicle. A handover process more robust to rapid channel variations is hence needed.

SUMMARY

The below summary section is intended to be merely exemplary and non-limiting.

Various aspects of examples of the invention are set out in the claims.

In a first aspect thereof an exemplary embodiment provides an apparatus comprising at least one processor and at least one memory including computer program code, wherein the at least one memory and the computer program code are configured, with the at least one processor, to cause said apparatus to determine that a path switch can be initiated during a handover of a user equipment from a first access node to a second access node, determine at least one condition for initiating the path switch, postpone the initiation of the path switch until the at least one condition has been met, and in response to determining that the at least one condition has been met, indicate the initiation of the path switch to the first access node or the second access node.

In another aspect thereof an exemplary embodiment provides an apparatus comprising at least one processor and at least one memory including computer program code, wherein the at least one memory and the computer program code are configured, with the at least one processor, to cause said apparatus to determine that a path switch can be initiated, during a handover of a user equipment from a first access node to a second access node, determine at least one condition for initiating the path switch, postpone the initiation of the path switch until the at least one condition has been met, and in response to determining that the at least one condition has been met, indicate the initiation of the path switch to the first access node or the second access node. The at least one condition comprises at least one of an empty buffer for the user equipment, a congested interface between the first access node and the second access node, a congested interface between one of the first or second access node and one of a mobility management entity or serving gateway, an expiry of a path switch postponement timer, a processing limitation at the first access node, and a condition requiring handover from the second access node to a third access node. The postponement timer of the path switch is equal to a predefined value depending on at least one of a channel measurement and a channel frequency. The condition of empty buffer for the user equipment is met when data buffered for the user equipment at the first access node or at a serving gateway is depleted. The condition of congested interface is met when the interface is determined to approach or reach a capacity limit of a defined value or is within a defined margin of the capacity limit.

In another aspect thereof an exemplary embodiment provides an apparatus comprising at least one processor and at least one memory including computer program code, wherein the at least one memory and the computer program code are configured, with the at least one processor, to cause said apparatus to determine that a path switch can be initiated, during a handover of a user equipment from a first access node to a second access node, determine at least one condition for initiating the path switch, postpone the initiation of the path switch until the at least one condition has been met, in response to determining that the at least one condition has been met, indicate the initiation of the path switch to the first access node or the second access node, and maintain at least one of a connection between the first access node and a mobility management entity or a connection between the first access node and a serving gateway at least until the at least one condition is met.

In further aspect thereof an exemplary embodiment provides an apparatus comprising at least one processor and at least one memory including computer program code, wherein the at least one memory and the computer program code are configured, with the at least one processor, to cause said apparatus to determine that a path switch can be initiated during a handover of a user equipment from a first access node to a second access node, determine at least one condition for initiating the path switch, postpone the initiation of the path switch until the at least one condition has been met, in response to determining that the at least one condition has been met, indicate the initiation of the path switch to the first access node or the second access node, and transmit or receive the at least condition from the first access node or the second access node.

In further aspect thereof an exemplary embodiment provides an apparatus comprising at least one processor and at least one memory including computer program code, wherein the at least one memory and the computer program code are configured, with the at least one processor, to cause said apparatus to determine that a path switch can be initiated during a handover of a user equipment from a first access node to a second access node, determine at least one condition for initiating the path switch, postpone the initiation of the path switch until the at least one condition has been met, in response to determining that the at least one condition has been met, indicate the initiation of the path switch to the first access node or the second access node. The apparatus comprises the first access node, or the second access node, or a network node, or a mobility management entity or a serving gateway.

In further aspect thereof an exemplary embodiment provides an apparatus comprising at least one processor and at least one memory including computer program code, wherein the at least one memory and the computer program code are configured, with the at least one processor, to cause said apparatus to determine that a path switch can be initiated during a handover of a user equipment from a first access node to a second access node, determine at least one condition for initiating the path switch, postpone the initiation of the path switch until the at least one condition has been met, and in response to determining that the at least one condition has been met, indicate the initiation of the path switch to the first access node or the second access node. The apparatus may be one of: wherein the apparatus is or is comprised in the first access node and wherein said at least one memory and said computer program code further configured, with said at least one processor, to cause said apparatus to start a path switch postponement timer in response to receiving a handover preparation confirmation message; wherein the apparatus is or is comprised in the second access node and wherein said at least one memory and said computer program code further configured, with said at least one processor, to cause said apparatus to start a path switch postponement timer in response to sending a handover preparation confirmation message; wherein the apparatus is or is comprised in a mobility management entity wherein said at least one memory and said computer program code further configured, with said at least one processor, to cause said apparatus to start a path switch postponement timer in response to receiving a path switch request message; and, wherein the apparatus is or is comprised in a serving gateway wherein said at least one memory and said computer program code further configured, with said at least one processor, to cause said apparatus to start a path switch postponement timer in response to receiving a modify bearer request message.

In another aspect thereof an exemplary embodiment provides an apparatus comprising means for determining that a path switch can be initiated during a handover of a user equipment from a first access node to a second access node, means for determining at least one condition for initiating the path switch, means for postponing the initiation of the path switch until the at least condition has been met, and means for indicating the initiation of the path switch to the first access node or the second access node in response to determining that the at least one condition has been met.

In another aspect thereof an exemplary embodiment provides an apparatus comprising means for determining that a path switch can be initiated during a handover of a user equipment from a first access node to a second access node, means for determining at least one condition for initiating the path switch, means for postponing the initiation of the path switch until the at least one condition has been met, and means for indicating the initiation of the path switch to the first access node or the second access node in response to determining that the at least one condition has been met. The at least one condition comprises at least one of: an empty buffer for the user equipment, a congested interface between the first access node and the second access node, a congested interface between one of the first or second access node and one of a mobility management entity or serving gateway, an expiry of a path switch postponement timer, a processing limitation at the first access node, and a condition requiring handover from the second access node to a third access node. The postponement timer of the path switch is equal to a predefined value depending on at least one of a channel measurement and a channel frequency. The condition of empty buffer for the user equipment is met when data buffered for the user equipment at the first access node or at a serving gateway is depleted. The condition of congested interface is met when the interface is determined to approach or reach a capacity limit of a defined value or is within a defined margin of the capacity limit.

In another aspect thereof an exemplary embodiment provides an apparatus comprising means for determining that a path switch can be initiated during a handover of a user equipment from a first access node to a second access node, means for determining at least one condition for initiating the path switch, means for postponing the initiation of the path switch until the at least one condition has been met, means for indicating the initiation of the path switch to the first access node or the second access node in response to determining that the at least one condition has been met, and means for maintaining at least one of a connection between the first access node and a mobility management entity or a connection between the first access node and a serving gateway at least until the at least one condition is met.

In another aspect thereof an exemplary embodiment provides an apparatus comprising means for determining that a path switch can be initiated during a handover of a user equipment from a first access node to a second access node, means for determining at least one condition for initiating the path switch, means for postponing the initiation of the path switch until the at least one condition has been met, means for indicating the initiation of the path switch to the first access node or the second access node in response to determining that the at least one condition has been met, and means for transmitting or receiving the at least condition from the first access node or the second access node.

In another aspect thereof an exemplary embodiment provides an apparatus comprising means for determining that a path switch can be initiated during a handover of a user equipment from a first access node to a second access node, means for determining at least one condition for initiating the path switch, means for postponing the initiation of the path switch until the at least one condition has been met, means for indicating the initiation of the path switch to the first access node or the second access node in response to determining that the at least one condition has been met. The apparatus comprises the first access node, or the second access node, or a network node, or a mobility management entity or a serving gateway.

In another aspect thereof an exemplary embodiment provides an apparatus comprising means for determining that a path switch can be initiated during a handover of a user equipment from a first access node to a second access node, means for determining at least one condition for initiating the path switch, means for postponing the initiation of the path switch until the at least one condition has been met, means for indicating the initiation of the path switch to the first access node or the second access node in response to determining that the at least one condition has been met. The apparatus may be one of: wherein the apparatus is or is comprised in the first access node and further comprises means for starting a path switch postponement timer in response to receiving a handover preparation confirmation message; wherein the apparatus is or is comprised in the second access node and further comprises means for starting a path switch postponement timer in response to sending a handover preparation confirmation message; wherein the apparatus is or is comprised in a mobility management entity and further comprises means for starting a path switch postponement timer in response to receiving a path switch request message; and wherein the apparatus is or is comprised in a serving gateway and further comprises means for starting a path switch postponement timer in response to receiving a modify bearer request message.

In another aspect thereof an exemplary embodiment provides a method comprising determining, by a network node, during a handover of a user equipment from a first access node to a second access node, that a path switch can be initiated, determining at least one condition for initiating the path switch, postponing the initiation of the path switch until the at least one condition has been met, and in response to determining that the at least one condition has been met, indicating the initiation of the path switch to the first access node or the second access node.

In another aspect thereof an exemplary embodiment provides a method comprising determining that a path switch can be initiated during a handover of a user equipment from a first access node to a second access node, determining at least one condition for initiating the path switch, postponing the initiation of the path switch until the at least one condition has been met, and indicating the initiation of the path switch to the first access node or the second access node in response to determining that the at least one condition has been met. The at least one condition comprises at least one of an empty buffer for the user equipment, a congested interface between the first access node and the second access node, a congested interface between one of the first or second access node and one of a mobility management entity or serving gateway, an expiry of a path switch postponement timer, a processing limitation at the first access node, and a condition requiring handover from the second access node to a third access node. The postponement timer of the path switch is equal to a predefined value depending on at least one of a channel measurement and a channel frequency. The condition of empty buffer for the user equipment is met when data buffered for the user equipment at the first access node or at a serving gateway is depleted. The condition of congested interface is met when the interface is determined to approach or reach a capacity limit of a defined value or is within a defined margin of the capacity limit.

In another aspect thereof an exemplary embodiment provides a method comprising determining that a path switch can be initiated during a handover of a user equipment from a first access node to a second access node, determining at least one condition for initiating the path switch, postponing the initiation of the path switch until the at least one condition has been met, indicating the initiation of the path switch to the first access node or the second access node in response to determining that the at least one condition has been met, and maintaining at least one of a connection between the first access node and a mobility management entity or a connection between the first access node and a serving gateway at least until the at least one condition is met.

In another aspect thereof an exemplary embodiment provides a method comprising determining that a path switch can be initiated during a handover of a user equipment from a first access node to a second access node, determining at least one condition for initiating the path switch, postponing the initiation of the path switch until the at least one condition has been met, indicating the initiation of the path switch to the first access node or the second access node in response to determining that the at least one condition has been met, and transmitting or receiving the at least condition from the first access node or the second access node.

In another aspect thereof an exemplary embodiment provides a method comprising determining that a path switch can be initiated during a handover of a user equipment from a first access node to a second access node, determining at least one condition for initiating the path switch, postponing the initiation of the path switch until the at least one condition has been met, indicating the initiation of the path switch to the first access node or the second access node in response to determining that the at least one condition has been met. The apparatus comprises the first access node, or the second access node, or a network node, or a mobility management entity or a serving gateway.

In another aspect thereof an exemplary embodiment provides a method comprising determining that a path switch can be initiated during a handover of a user equipment from a first access node to a second access node, determining at least one condition for initiating the path switch, postponing the initiation of the path switch until the at least one condition has been met, indicating the initiation of the path switch to the first access node or the second access node in response to determining that the at least one condition has been met. The apparatus may be one of: wherein the network node is the first access node and further comprising starting a path switch postponement timer in response to receiving a handover preparation confirmation message; wherein the network node is the second access node and further comprising starting a path switch postponement timer in response to sending a handover preparation confirmation message; wherein the network node is a mobility management entity and further comprising starting a path switch postponement timer in response to receiving a path switch request message; and, wherein the network node is a serving gateway and further comprising starting a path switch postponement timer in response to receiving a modify bearer request message.

In another aspect thereof an exemplary embodiment provides a computer readable medium tangibly encoded with a computer program executable by a processor to perform actions comprising determining that a path switch can be initiated during a handover of a user equipment from a first access node to a second access node, determining at least one condition for initiating the path switch, postponing the initiation of the path switch until the at least one condition has been met and indicating the initiation of the path switch to the first access node or the second access node in response to determining that the at least one condition has been met.

In another aspect thereof an exemplary embodiment provides a computer readable medium tangibly encoded with a computer program executable by a processor to perform actions comprising determining that a path switch can be initiated during a handover of a user equipment from a first access node to a second access node, determining at least one condition for initiating the path switch, postponing the initiation of the path switch until the at least one condition has been met, and indicating the initiation of the path switch to the first access node or the second access node in response to determining that the at least one condition has been met. The at least one condition comprises at least one of: an empty buffer for the user equipment, a congested interface between the first access node and the second access node, a congested interface between one of the first or second access node and one of a mobility management entity or serving gateway, an expiry of a path switch postponement timer, a processing limitation at the first access node, and a condition requiring handover from the second access node to a third access node. The postponement timer of the path switch is equal to a predefined value depending on at least one of a channel measurement and a channel frequency. The condition of empty buffer for the user equipment is met when data buffered for the user equipment at the first access node or at a serving gateway is depleted. The condition of congested interface is met when the interface is determined to approach or reach a capacity limit of a defined value or is within a defined margin of the capacity limit.

In another aspect thereof an exemplary embodiment provides a computer readable medium tangibly encoded with a computer program executable by a processor to perform actions comprising determining that a path switch can be initiated during a handover of a user equipment from a first access node to a second access node, determining at least one condition for initiating the path switch, postponing the initiation of the path switch until the at least one condition has been met, indicating the initiation of the path switch to the first access node or the second access node in response to determining that the at least one condition has been met, and maintaining at least one of a connection between the first access node and a mobility management entity or a connection between the first access node and a serving gateway at least until the at least one condition is met.

In another aspect thereof an exemplary embodiment provides a computer readable medium tangibly encoded with a computer program executable by a processor to perform actions comprising determining that a path switch can be initiated, during a handover of a user equipment from a first access node to a second access node, determining at least one condition for initiating the path switch, postponing the initiation of the path switch until the at least one condition has been met, indicating the initiation of the path switch to the first access node or the second access node in response to determining that the at least one condition has been met, and transmitting or receiving the at least condition from the first access node or the second access node.

In another aspect thereof an exemplary embodiment provides a computer readable medium tangibly encoded with a computer program executable by a processor to perform actions comprising determining that a path switch can be initiated during a handover of a user equipment from a first access node to a second access node, determining at least one condition for initiating the path switch, postponing the initiation of the path switch until the at least one condition has been met, indicating the initiation of the path switch to the first access node or the second access node in response to determining that the at least one condition has been met. The apparatus comprises the first access node, or the second access node, or a network node, or a mobility management entity or a serving gateway.

In another aspect thereof an exemplary embodiment provides a computer readable medium tangibly encoded with a computer program executable by a processor to perform actions comprising determining that a path switch can be initiated during a handover of a user equipment from a first access node to a second access node, determining at least one condition for initiating the path switch, postponing the initiation of the path switch until the at least one condition has been met, indicating the initiation of the path switch to the first access node or the second access node in response to determining that the at least one condition has been met. The apparatus may be one of: wherein the network node is the first access node and further comprising starting a path switch postponement timer in response to receiving a handover preparation confirmation message; wherein the network node is the second access node and further comprising starting a path switch postponement timer in response to sending a handover preparation confirmation message; wherein the network node is a mobility management entity and further comprising starting a path switch postponement timer in response to receiving a path switch request message; and, wherein the network node is a serving gateway and further comprising starting a path switch postponement timer in response to receiving a modify bearer request message.

BRIEF DESCRIPTION OF THE DRAWINGS

The foregoing and other aspects of exemplary embodiments are made more evident in the following Detailed Description, when read in conjunction with the attached Figures, wherein.

DETAILED DESCRIPTION

Handover can be divided into hard handover and soft handover. A hard handover is one in which the radio resources in the source cell is released and then the radio resources in the target cell is engaged. A soft handover is one in which the radio resources in the source cell are retained and used while the radio resources in the target cell are used.

Cell switching is addressed in 3GPP universal terrestrial radio access (UTRAN) and evolved universal terrestrial radio access (E-UTRAN) systems via the process described below. A similar process is followed for other radio technologies that implement hard handover process as well, for example, high speed downlink shared channel (HS-DSCH) in UTRAN release 6 specified by 3GPP, WiMAX systems based on IEEE 802.16e and 802.16m, etc.

Figure 1:
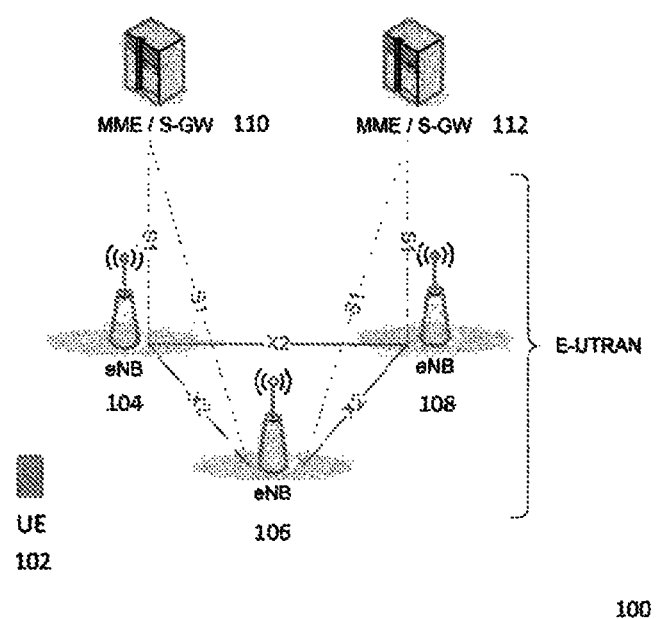
FIG. 1 illustrates an example of an overall architecture of a E-UTRAN system.

FIG. 1 illustrates an example of an overall architecture of an E-UTRAN system. The E-UTRAN system 100 includes eNBs 104, 106, and 108, providing an E-UTRAN user plane (PDCP/RLC/MAC/PHY) and control plane (RRC) protocol terminations towards the UE 102. The eNBs are interconnected with each other via an X2 interface, also known as an X2 link. The eNBs are also connected via S1 interface, also known as an S1 link, to an Evolved Packet Core (EPC), more specifically to a Mobility Management Entity (MME) through the S1-MME interface and to a Serving Gateway (S-GW), also known as s-GW or sGW, by means of the S1-U interface. The MME and sGW may be considered as part of a core network and each may be considered as a network node. The S1 interface supports many-to-many relations between MMEs/Serving Gateways and eNBs.

The UE 102, as an example of a mobile terminal, is originally located under the wireless service coverage provided by eNB 104, as an example of a source access node. The eNB 104 is connected with eNB 106 and eNB 108 via the X2 interface respectively, as well as connected with MME/S-GW 110 via the S1 interface. When the UE 102 moves towards the area under the coverage of a neighboring eNB of eNB 104, namely eNB 106, the UE 102 measures the strength of the signals from eNB 104 as well as from eNB 106. The UE 102 reports the measurement results to eNB 104 for it to decide whether handing over UE 102 from eNB 104 to eNB 106 is needed. Once eNB 104 decides that the handover should take place, it will prepare the handover via signalling between the target eNB 106 and itself, signalling between itself and the UE 102, and signalling between itself and MME/S-GW 110.

Figure 2:
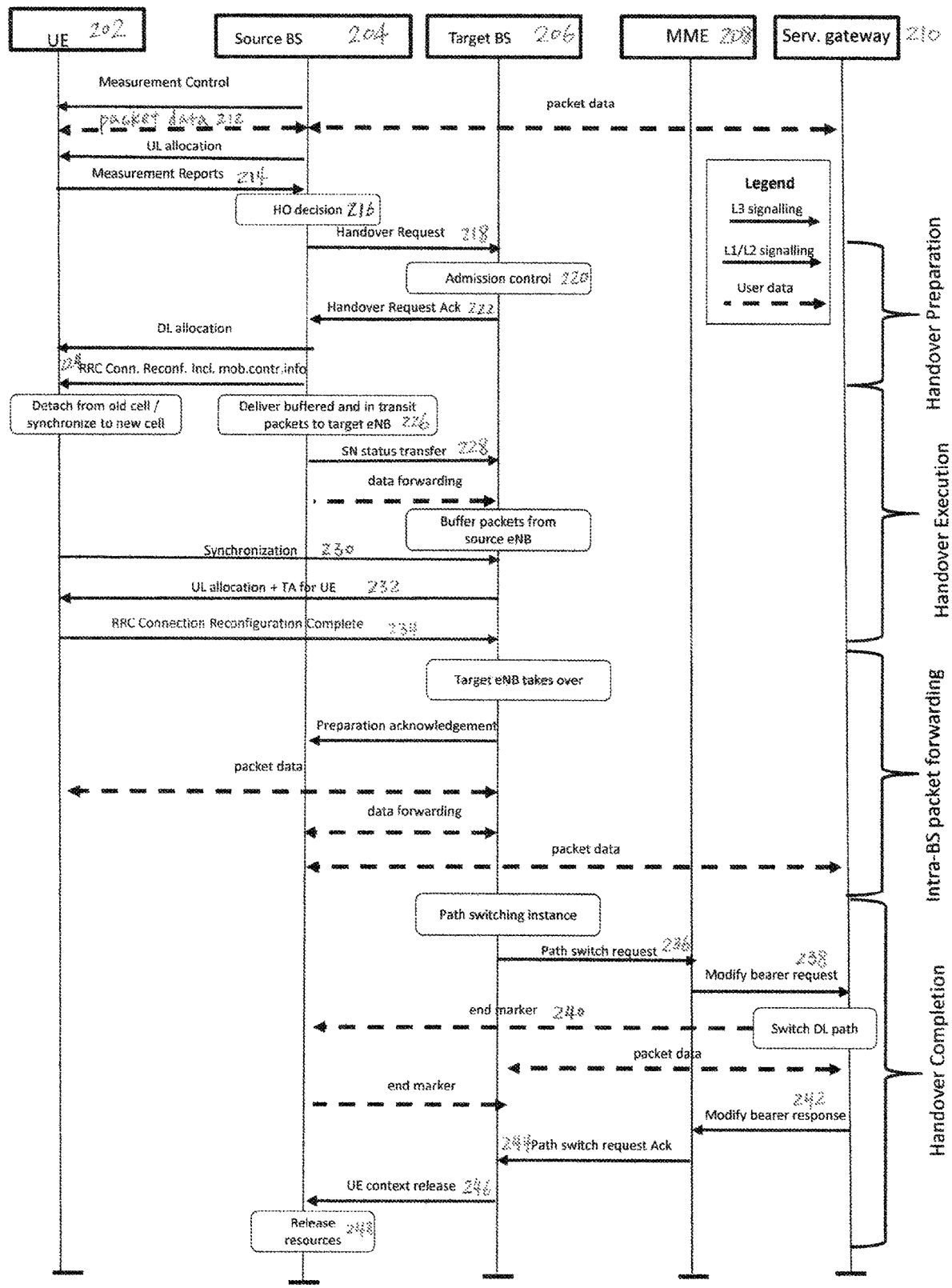
FIG. 2 illustrates an example of a hard handover process in a wireless network.

FIG. 2 illustrates an example of a hard handover process in a wireless network, in which source BS/eNB 204, also known as source access node, is referred as the access node to which the mobile terminal, also known as user equipment or UE 202, is initially connected. And, target BS/eNB 206, also known as target access node, is referred as the access node to which the data traffic needs to be transferred to.

The first stage of the hard handover is pre-handover phase. This is the phase before a handover is initiated. Data is exchanged at 212 between the source BS 204 and the UE 202. The UE 202 performs channel measurements of the channel to source BS 204, as well as to neighboring BSs. Such measurement reports are transmitted from the UE 202, as shown at 214, to the source BS 204 along with the data.

The second stage is handover preparation, including a handover decision being made and a handover request being sent. Based on the measurement reports, a decision for handover is made by the source BS 204 at 216, if the signal strength of the channel between the UE 202 and another BS is larger than that of the channel between the UE 202 and the source BS 204 plus a pre-defined offset, which may be zero or larger than zero. The other BS is determined to be the target BS, which is BS 206 in this example. The source BS 204 sends a handover request 218, in order to handover the service provided for the UE 202 from itself to the target BS 206. To facilitate the handover, all necessary information, for example, radio resource control (RRC) context and E-UTRAN radio access bearer (E-RAB) attributes, are transferred from the source BS 204 to the target BS 206. The target BS 206 performs admission control at 220 and, if positive, acknowledges the handover request at 222 to the source BS 204.

Handover execution is the third stage. The UE 202 is ready to be detached from the source BS 204 and to be attached to the target BS 206. At 224, the source BS 204 transmits RRC connection reconfiguration messages including mobility control information such as dedicated random access channel (RACH) preamble, target BS system information blocks (SIBs), new Cell Radio Network Temporary Identifier (C-RNTI), etc. to the UE 202, causing UE 202 to detach from source BS 204. Buffered and in transit data packets are forwarded from the source BS 204 to the target BS 206 at 226. The sequence number of packet data convergence protocol (PDCP) layer packets is transferred alongside at 228, in order to distinguish the packets which have been already sent from those still in the buffer.

Using the information received in the previous phase, the UE 202 synchronizes with the target BS 206 at 230 and accesses the target cell via a RACH procedure. After successful synchronization, the target BS 206 sends a response message which includes uplink (UL) allocation and timing advance (TA) information at 232. The UE 202 confirms the handover to the target BS 206 by sending the RRC_Connection_Reconfiguration_Completed message at 234.

The final stage is the handover completion, including path switching initiation and path switch confirmation and context release. Once the target BS 204 receives RRC_Connection_Reconfiguration_Completed message from the UE 202, it transmits path switch request 236 to MME 208 right away. The target BS 206 informs MME 208 about the handover of the UE 202 from source BS 204 to the target BS 206 by sending the path switch request message at 236. The MME 208 then updates serving gateway 210 by sending a corresponding "modify bearer" request message 238. At 240, the serving gateway 210 switches the path of the downlink data to the target BS 206; and it further sends "end marker" packets to the source BS 204 indicating the termination of the old path and release resources towards the source BS 204. The serving gateway 210 acknowledges the MME 208 with "modify bearer" response 242.

The MME 208 acknowledges the path switch by sending a "path switch acknowledge" message 244, to the target BS 206. The target BS 206 informs the source BS 204 about the success of the handover by sending "UE context release" message 246, which also signifies the release of the resources by the source BS 204. At 248, the source BS 204 releases U-plane and C-plane related resources associated with the UE 202. Data may now be exchanged between the UE 202 and the target BS 206, which indicates the completion of the handover process.

Soft handover refers to a special case of handover, which is standardized for Wideband Code Division Multiple Access (WCDMA) or Code Division Multiple Access (CDMA) based 3G systems such as Universal Mobile Telecommunications System (UMTS) and Interim Standard 95 (IS-95). Its operation is based upon defining a set of cells able to establish connection with the UE, namely the active set, and then selecting the cell with the strongest channel to the UE. From another viewpoint, soft handover represents a macro diversity implementation, since it involves selection or combination of data from cells in the active set.

Soft handover involves updating the active set based on the strength of the corresponding channels connecting the UE and the candidate cells. In this regard, two main events defined in 3GPP TR 25.922 V7.0.0 Evolved Universal Terrestrial Radio Access (E-UTRA), Radio Resource Control, Protocol Specification, pertaining to the active set update are so-called "1A" and "1B" events, which are explained below in detail.

The "1A" event specifies cell additions to the active set. In particular, denoting the active set by A, a new cell n will be added to the active set, if $$M_n + O_{cn} > \max_{s \in A}(M_s) + \mathit{Off}_{add},$$

where $M_n$ denotes the channel measurement associated with the new cell n; $O_{cn}$ denotes an offset parameter associated with cell n, used for avoiding too early as well as too late additions to the active set; $\mathit{Off}_{add}$ denotes an offset parameter used for controlling the number of cells belonging to the active set; and, parameter s denotes any serving cell within the active set, i.e. A:[$s_1, s_2, \ldots, s_{n-1}$].

The above condition states that a new cell is added to the active set if its measurement is better than the measurement of the best cell in the active set plus the offset, which can be either positive or negative value. In such case, the RNC updates the active set accordingly, and thereby the best cell is selected on the basis of the updated candidate set.

The "1B" event specifies the case where a cell is removed from the active set. In particular, a cell $s_0$ is removed, if the following condition is met $$M_n + O_{cn} < \max_{s \in A}(M_s) + \mathit{Off}_{remove}$$

That is, a cell would be removed if it falls significantly below the best cell, as this is specified by the remove offset $\mathit{Off}_{remove}$. In order to avoid the alternating addition and removal of the same cell, similar to a "ping-pong" effect, $\mathit{Off}_{add}$ and $\mathit{Off}_{remove}$ should be considerably different from each other.

For example, $O_{cn}$=0; $O_{cs}$=0; $\mathit{Off}_{add}$=−6 dB; and $\mathit{Off}_{remove}$=−8 dB, a cell would be added using event 1A when it becomes closer than 6 dB to the best cell as $$M_n > \max_{s \in A}(Ms) - 6 \text{ dB};$$

and, a cell would be removed using event 1B when it falls more than 6 dB below the best cell as $$M_n < \max_{s \in A}(Ms) - 8 \text{ dB}.$$

Coordinated Multipoint (CoMP) is one of the techniques adopted in LTE. With CoMP, the UE is able to connect to two or more distribution points at the same time, and exchange information with them in a joint manner Such distribution points can be either cells or remote radio heads. The major advantage from CoMP is that the network is able to optimize its transmission and/or reception to and/or from the UEs, by appropriately coordinating the transmissions occurring simultaneously.

The CoMP concept is implemented in LTE on the basis of two major variations, known as joint transmission (JT) and coordinated scheduling. In JT, the multiple distribution points jointly transmit information to the UE, in the sense that the information is transmitted fully or partially by each of the distribution points involved. In coordinated scheduling, only one participating point transmits information while the remaining points adjust their transmission to other UEs such that they minimize the interference caused to the given UE. In both cases, the major objective is to increase user throughput at the cell edge and increase system capacity.

In CoMP, the set of participating distribution points is defined either statically or dynamically. Static clustering is usually accomplished based on geographical criteria whereas dynamic clustering changes the set of points over time, so as to adapt to wireless channel variations. The set of distribution points is usually not user-centric and is targeted for coordinating transmission of data signals.

CoMP represents a special case of handover since it involves interaction between a user and multiple cells or remote radio heads, though it is not explicitly treated as a handover approach. In fact, CoMP provides an alternative handover solution with high performance. However, its complexity is relatively high, owing to the necessary coordination between the distribution points. As such, CoMP is not always implementable, since it can be supported only by certain network realizations, for example, where the backhaul connection among the distribution points is fast as well as not substantially congested, as well as by certain type of UEs, for example, the UEs capable of complex processing. As a result, CoMP can address issues associated with mobility and handover only to a limited extent.

Machine-Type Communications (MTC) has become part of LTE Advanced (LTE-A) network. Handover approaches of MTC have been mainly designed for applications which are relatively robust to time interruption caused by handover. Examples of such applications are mobile telephony and internet browsing. In the case of mobile telephony, when a path switching is initiated, the interruption occurs but is generally not noticed by the user, since hearing time resolution is low enough to allow smooth transitioning. In the case of internet browsing, handover interruption is also not critical since, by its nature, internet browsing is delay-tolerant. However, future 5G communications are anticipated to accommodate machine-type applications together with existing human-oriented ones. This poses challenges to the handover procedure since the tolerance in terms of delay of the machine-oriented applications is lower than that of their human-oriented counterparts. Consequently, current handover procedures are not necessarily suitable for MTC. Thus, alternative approaches are needed.

Part of the fundamental difference of 5G communications with respect to its predecessors is the use of higher frequency spectrum, in order to allow for larger bandwidth allocated for user data transmission. This implies that transmissions in 5G frequencies, such as bands of the centimeter wave (cmW) and the millimeter wave (mmW), experience more abrupt channel variations than transmissions in lower frequency bands used by current cellular systems. This in turn implies that a considerably larger number of handovers is anticipated for 5G, which in many cases is expected to occur between the same cells back and forth. In other words, the "ping-pong" instance of handover between two cells is expected to be seen relatively often in 5G, unless a distinct handover approach is adopted. This distinct approach should encompass the idea of waiting long enough to ensure that the channel change which triggers the handover is not a short term effect, such as some passing vehicle temporarily blocking the line-of-sight between UE and BS, but a longer change instead.

Path switch occurs in the later stage of the handover, as described previously. One of the solutions to deal with the "ping-pong" effect is not to initiate path switch immediately after the path switch being triggered. Instead, path switching may be deliberately postponed to a later time. In the mean time, data packets as well as control packets are forwarded from the source access node to the target access node via the X2 interface, which is defined as the interface between a source eNB also known as source access node and a target eNB also known as target access node in LTE or LTE-A.

Referring to the time instance that the path switching takes place as the path switching instance. Ideally, the path switching instance is chosen as to maintain the service to the mobile terminal uninterrupted. In other words, a path switch will not occur until the data buffer at the source access node or at the serving gateway pertaining to the delay critical service to the mobile terminal is empty, or a certain timer used for this purpose is expired. Meanwhile, as long as there is sufficient backhaul availability, data packets and control messages are forwarded from the source access node to the target access node via the X2 interface. This implies that neither the serving gateway nor the MME are employed for forwarding data from the source access node to the target access node. In other words, this handover procedure is transparent to the MME and the serving gateway until the path switching instance occurs.

In MTC, postponing the path switch or path switching instance may reduce the impact of connection "ping-pong" on the network resulting from rapid channel variations without meaningfully impacting the connection as experienced by the UE. It particularly benefits the applications where small packets are transmitted with some time interval between them, which is typical for machine-type applications. The path switch postponing or path switch delay will occur during the interval between transmissions, in order to avoid causing any delay in packet delivery. This will increase the reliability of such applications from the mobile terminal or UE point of view.

For the cases of using cmW or mmW frequencies, postponing or delaying the path switch entails less frequent ping-pong phenomenon, because the mobility remains with the source access node or the source eNB, even if the connection to the target access node or the target eNB is temporarily stronger. In other words, postponing or delaying the path switch enables a more thorough path switching decision in the way that connection between the target access node or the target eNB and the mobile terminal or the UE can be easily reverted to the source access node or the source eNB with less cost on delay and complexity. Postponing or delaying the path switch increases the reliability of delay critical applications in cmW and/or mmW frequency bands.

Figure 3:
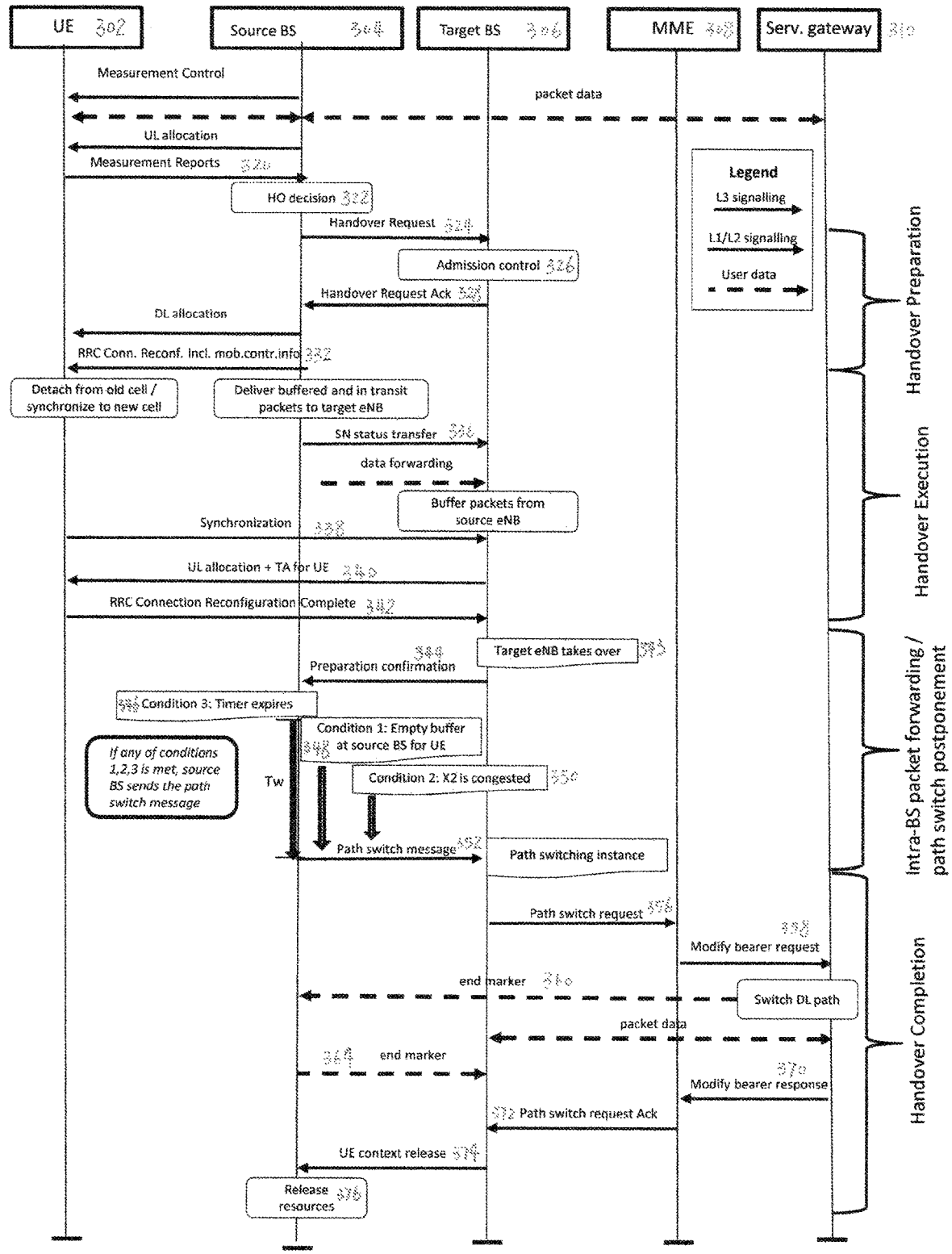
FIG. 3 illustrates an example of a postponed path switch handover process in a wireless network.

FIG. 3 illustrates an example of a postponed path switch handover process in a wireless network. Prior to a handover initiated, the UE 302, also known as the mobile terminal, and the source BS 304, also known as source access node or source NB or source eNB, exchange data. The UE 302 performs channel measurements of the channels of the source BS as well as the channels of neighboring BSs. Then it transmits measurement reports 320 to the source BS 304 along with data.

Based on the measurement reports, the source BS 304 makes a handover (HO) decision at 322, typically when the strength of the channel between the UE and one of the neighboring BSs is larger than the strength of the channel between the UE 302 and the source BS 304 with a pre-defined offset, which could be equal to or larger than zero. As a result of the handover decision, one of the neighboring BSs may become the target BS 306. The source BS 304 sends a handover request 324 to the target BS 306 via an X2 interface. To facilitate the handover, all the necessary information, for example, RRC context and E-RAB attributes, is transmitted from the source BS 304 to the target BS 306. The target BS 306 may perform admission control at 326 and, if positive, acknowledges the handover request to the source BS 304 at 328.

At 332, the source BS 304 transmits RRC connection reconfiguration messages including mobility control information received from the target BS 306, for example, dedicated RACH preamble, one or more target BS system information blocks, a new cell radio network temporary identifier (C-RNTI), etc., to the UE 302. The source BS 304 forwards buffered and in transit data packets to the target BS 306. A sequence number of PDCP layer packets is transferred to the target BS 306 at 336 in order to distinguish the packets already been sent from the ones still in the buffer. The UE 302 synchronizes with the target BS 306 and accesses the target cell via a RACH procedure at 338. Then, the target BS 306 sends UE 302 a response including uplink (UL) allocation and timing advance (TA) information at 340. The UE 302 confirms the handover to the target BS 306 by sending an appropriate message such as RRC_Connection_Reconfiguration_Complete message 342 to the target BS 306. The target BS 306 verifies the C-RNTI included in this message and takes over the role as a service provider at 343. The connection between the UE 302 and the source BS 304 is terminated.

After the handover is verified by the target BS 306, at 344, the target BS 306 informs the source BS 304 that a connection between the target BS 306 and the UE 302 is prepared. The source BS 304 terminates its connection with the UE 302 and the target BS 306 takes over, using the sequence number it received earlier from the source BS. Instead of sending a path switch request from the target BS 306 at this time, a postponement of a path switch takes place. A path switch countdown timer process, described as 346, is initiated as part of the postponing or delaying path switch procedure. The source BS 304 may set the path switch timer equal to a pre-defined value which may depend on long term channel measurements or may be fixed or may be dependent on a channel frequency, and starts counting down. The pre-defined value can be equal to or larger than zero. One skilled in the art will appreciate that one may in any other known fashion measure a duration in accordance with the pre-defined value without departing from the scope of the counting down, for example by counting up from zero to the pre-defined value. In some circumstances, the purpose of the path switch countdown process is to trigger a path switch after a pre-defined time, regardless whether other path switching conditions are met, if there are other path switching conditions. The timer can be the only condition. In some other embodiments, the expiry of the timer can be one of the conditions and more than one or all of the conditions such as the events described infra may need to be satisfied in order to trigger the path switch.

In the meantime, the source BS 304 maintains its connection with the serving gateway 310 and the MME 308, as if no handover has been preceded. Each of the source BS, the target BS, the MME and the serving gateway may be considered as a network node. The handover is so far transparent to the core network. From the core network's perspective, the UE 302 is still connected to the source BS 304. The source BS 304 forwards all the data and control packets to the target BS 306 via the X2 interface. Thus, the data and control messages are exchanged between the source BS 304 and the UE 302 via the target BS 306, until one or more of the following exemplary events occurs. In such case, the path switch or the path switching instance is triggered by a path switch message sent from the source BS 304 to the target BS 306, leading to the handover completion. In an alternative embodiment, the path switch may be triggered by a path switch request sent from the target BS 306, where optionally the target BS 306 may inform the source BS 306 of the triggered path switch through a path switch message. As such, in certain embodiments, either or both of the source BS 304 and target BS 306 may monitor event(s) for triggering the initiation of a path switch. If the event(s) is monitored at the source BS 304, it will transmit a path switch message 352 to the target BS 306, when one or more than one of the events occurs. If the event(s) is monitored at the target BS 306 instead, the target BS 306 determines the path switch instance. The events which may trigger the path switching instance may be one or more of the following.

A few non-limiting embodiments of events which may be monitored for triggering a path switch are:
 detection (348) of an empty buffer
 detection (350) of a congested backhaul (e.g. X2) connection between source and target BS
 detection (346) of a path switch timer
 detection of a congested backhaul (e.g. S1) connection between the source BS and an MME and/or gateway (110, 112)
 detection of a processing limitation at the source BS or the target BS
 detection of a condition requiring handover from the target BS to a third BS.

The event(s) is also called condition(s) that needs to be met prior to initiating a path switch. In other words, the path switch is postponed or delayed until at least one of the conditions is met or satisfied. It is noted that postponement or delay in the context of this invention should be construed to mean waiting to initiate substantially beyond a nearest transmission opportunity, where the availability of a transmission opportunity for path switch message or request should not be considered an event or condition in the context of this disclosure. The path switch timer may be called a postponement timer for path switch.

The congested backhaul connection, for example X2 interface or S1 interface, occurs when a load on the X2 or the S1 interface is determined to approach or reach a capacity limit of a defined value or a capacity limit within a defined margin. The congested connection between source and target access nodes or between the source access node and an MME and/or gateway may be the sole condition or one of the conditions for postponement of the path switch. The path switch events are not limited to these listed events. The path switch may be triggered when one or more than one of the events occur, which results in postponing or delaying of the path switch.

The determination of at least one of the above exemplary events or conditions being met indicates the initiation of the postponed or delayed path switch. The target BS 306 transmits the path switch request message 356, informing the MME 308 about the handover of the UE 302 from the source BS 304 to the target BS 306. The MME 308, at 358, updates the serving gateway (Serv. GW or sGW) 310 by sending a corresponding modify bearer request message. Till now, at least one of a connection between the source BS 304 and the MME 308 or a connection between the source BS 304 and the serving gateway 310 remains. The serving gateway 310 switches the path of the downlink data to the target BS 306; and, it further sends "end marker" message to the source BS 304 indicating the termination of the old path and releases resources to the source BS 304 at 360. The source BS 304 responds to the "end marker" message with its own "end marker" message 364. The serving gateway 310 transmits modify bearer response to the MME 308 at 370 as a reply to the received modify bearer request from the MME 308.

The MME 308 acknowledges the path switch by sending a path switch acknowledge message to the target BS 306 at 372. The target BS 306 informs the source BS 304 about the success of the handover by sending the UE context release message at 374. The source BS 304 releases the U-plane and C-plane related resources associated with the UE 302 in 376. Data may now be exchanged between the UE 302 and the target BS 306 directly to the core network (308, 310) rather than through source BS 304. This completes the handover procedure with postponed or delayed path switch determined by the source BS 304.

Figure 4:
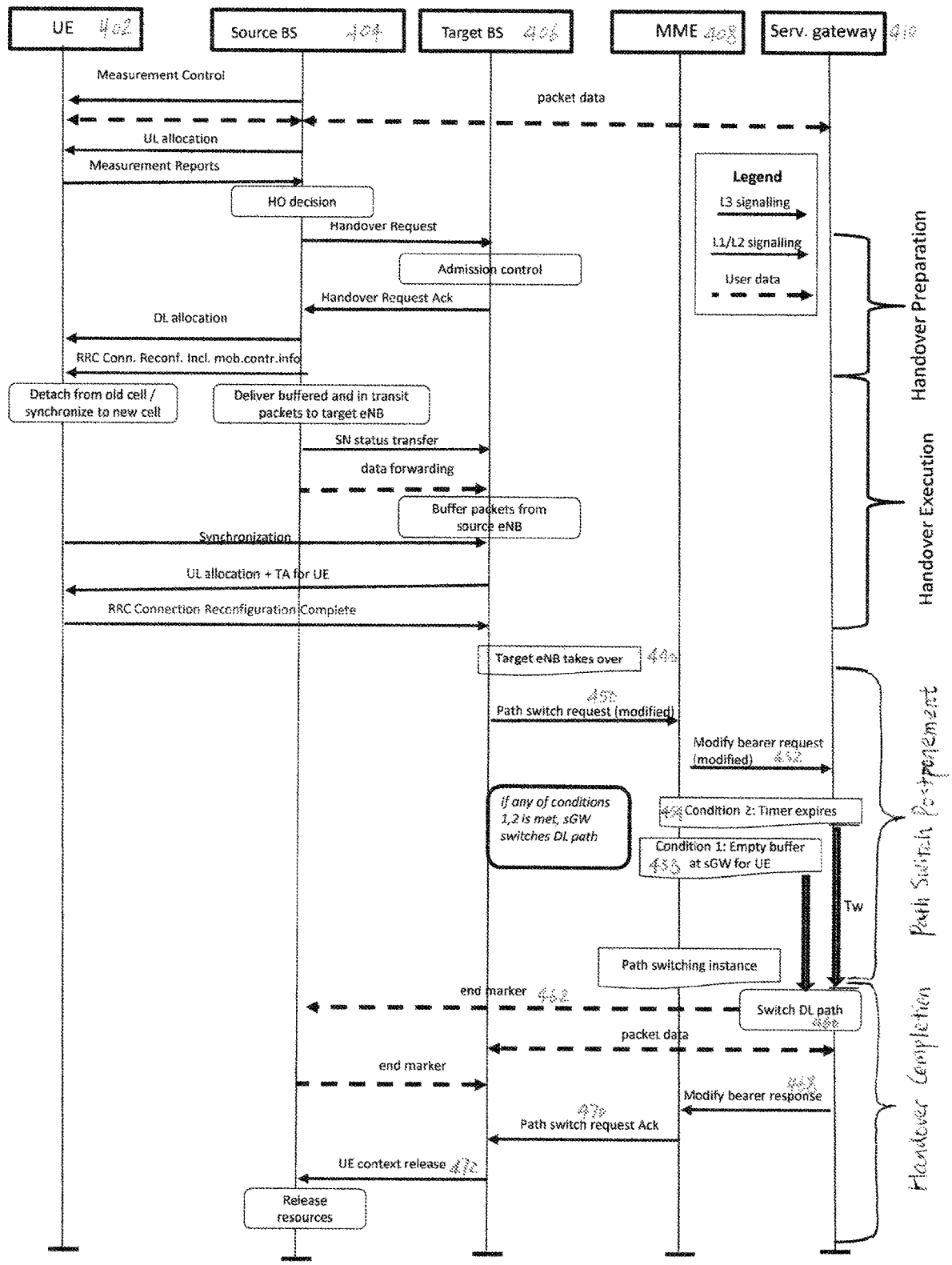
FIG. 4 illustrates another example of a postponed path switch handover process in a wireless network.

In yet an alternate embodiment as depicted in FIG. 4, the path switch decision may be taken at the serving gateway 410. The procedure of handover prior to the target eNB or BS 406 taking over the source BS 404 as a wireless service provider for the UE remains the same as the procedure described in FIG. 3. For example, with reference made to FIG. 4, the path switch request message 450 sent from the target BS 406 to the MME 408 may contain one or more events or conditions that may initiate the path switch. The MME 408 may determines the initiation of the postponed or delayed path switch when one or more of these events or conditions is met or satisfied. The MME 408 may also forward (452) at least one of the conditions and/or events of this message to the serving gateway 410 or alternatively or additionally may insert one or more events or conditions that may initiate the path switch, and the serving gateway 410 examines whether the one or more of the events or conditions, either based on the conditions and/or events included in the message 452 or conditions and/or events preconfigured in the serving gateway 410, for path switch are met. Unlike the serving gateway 210 in FIG. 2 replying the modify bearer request 238 with switch downlink path, the serving gateway 410 of FIG. 4 determines at least one condition for initiating path switch after receiving the modify bearer request 452 from the MME 408. If one or more events or conditions for path switch are met, the postponed path switch takes place.

The events or the conditions for a path switch can be, for example, empty buffer at serving gateway in 453 or at MME 408, expiry of path switch timer in 454, any of the previously described events, etc. Once the data buffered for the UE at the source BS are considered depleted, meaning the condition of empty buffer at serving gateway is fulfilled, a path switching is triggered. The determination of the one or more than one of the events or the conditions being met indicates the initiation of the postponed or delayed path switch. In yet another embodiment, the conditions and/or events may be monitored, and the initiation of the postponed path switch decided, at the MME 408.

One exemplary event or condition is empty buffer at serving gateway in 453. Once the data buffered for the UE 402 at the serving gateway 410 is depleted, a path switch is triggered, if the empty buffer at sGW for UE is the sole condition for triggering the path switch.

Another exemplary event or condition is expiry of a path switch timer. The path switch request message contains a timer information regarding the time after which a path switch must occur as shown in 454 of FIG. 4. The sGW 410 sets a timer based on that information and counts down. If the timer expires, then a path switch takes place. The value of the timer is equal to a predefined value, and the value depends on a channel measurement. One skilled in the art will appreciate that one may in any other known fashion measure a duration in accordance with the pre-defined value without departing from the scope of the counting down, for example by counting up from zero to the pre-defined value.

Each of the exemplary events or conditions may be the only condition to be met for triggering a path switch. Alternatively, more than one of these two exemplary events or conditions may need to be satisfied in order to trigger the path switch. The path switch is postponed or delayed till the event(s) or the condition(s) to be met are satisfied.

While the event(s) or the condition(s) to be met are not yet satisfied, at least one of a connection between the source BS 404 and the MME 408 or a connection between the source BS 404 and sGW 410 remains. The sGW 410 switches the path of the downlink data to the target BS 406 at 460; and, it further sends at 462 end marker message to the source eNB 404, indicating the termination of the old path and releases resources to the source BS 404. The serving gateway 410 acknowledges the MME 408 with modify bearer response 468 as a reply to the modify bearer request sent at 452.

In response to path switch request 450 from the target BS 406, the MME 408 acknowledges the path switch by sending the target BS 406 a path switch acknowledge message 470. The target BS 406 informs the source BS 404 about the success of the handover by sending the UE context release message 472, which also signifies the release of the resources by the source BS 404. The source BS 404 releases then U-plane and C-plane related resources associated with the UE 402. Data may now be exchanged between the UE 402 and the target BS 406 directly to the core network (408, 410) rather than through source BS 404.

Figure 5:
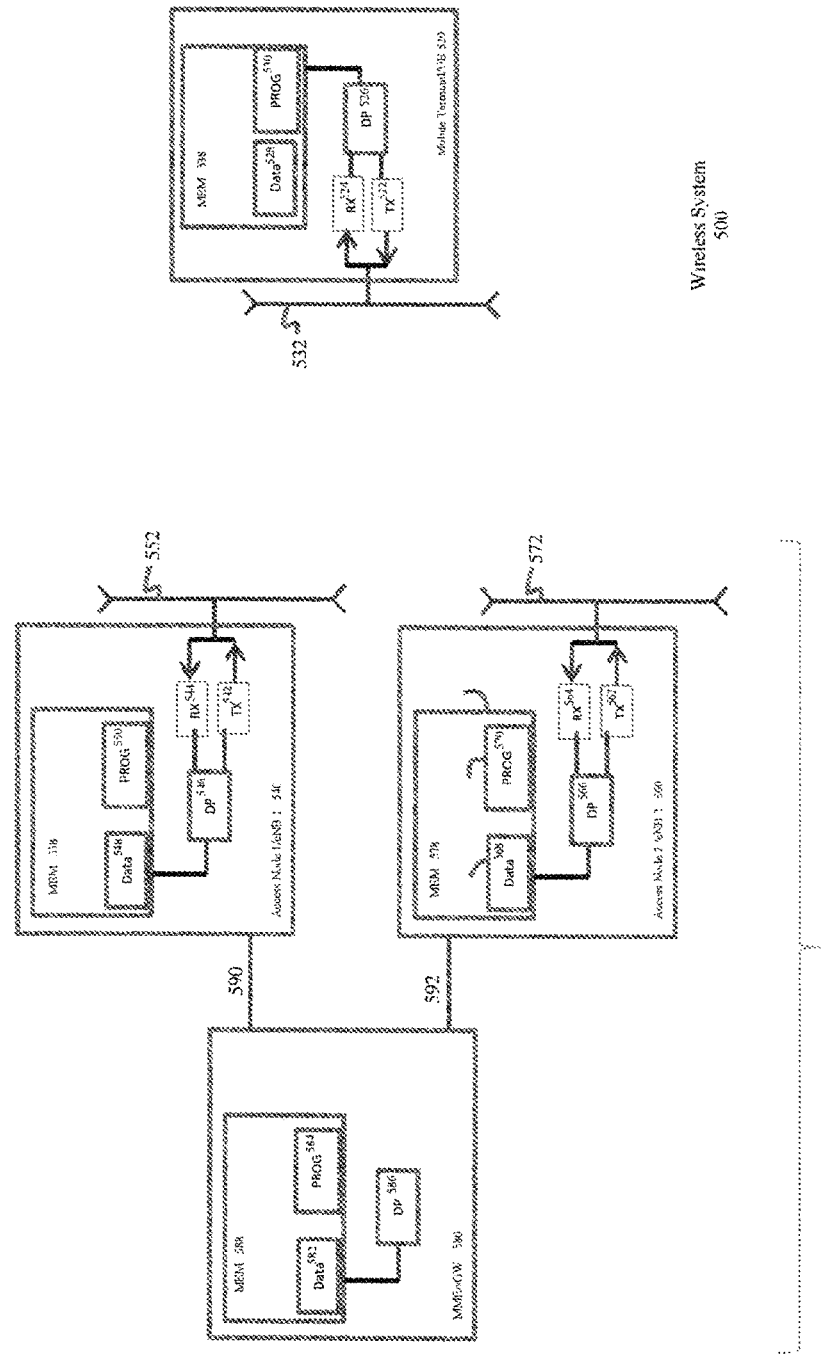
FIG. 5 illustrates an example of a simplified block diagram of a handover in a wireless network.

Reference is now made to FIG. 5, an illustration of an example of a simplified block diagram of a handover in a wireless system 500, including a wireless network 505 communicates with a mobile communication device which may be referred to as a mobile terminal or UE 520 via a network access node such as eNB1 540 or eNB2 560. Whether the mobile terminal 520 is connected to the access node 1 (540) or the access node 2 (560) depends on the channel condition of each of the wireless channels between the mobile terminal 520 and the access nodes 1 and 2 respectively. Assuming the mobile terminal 520 is connected to the access node 1 540 as its source access node originally, the mobile terminal 520 measures the signal strength of each channel periodically or unperiodically. When the signal strength between the mobile terminal 520 and the access node 2 (560) becomes stronger than that between the mobile terminal 520 and the access node 1 (540), a handover may occur if a pre-defined condition is satisfied or met.

The wireless network 505 may include MME/s-GW 580, which may provide connectivity with a network, for example, a telephone network and/or a data communication network like the Internet.

The mobile terminal, also known as UE, 520 includes at least one computer-readable memory medium embodied as a memory (MEM) 538, for storing Data 528, at least one computer program (PROG) 530, or other set of executable instructions, a computer or at least one data processor (DP) 526, and communication means such as at least one transmitter (TX) 522, and at least one receiver (RX) 524 for bidirectional wireless communications with the access node 1, also known as eNB1 540, or with the access node 2, also known as eNB2 560 via one or more antennas 552 or 572, for example two antennas as shown in FIG. 5, for bidirectional communications. It is commonly found that one or more UEs are under the control of an eNB such as eNB1 540. And, same for eNB2 560.

The access node 1 (540) also includes a computer or at least one data processor (DP) 546, at least one computer-readable memory medium embodied as a memory (MEM) 558 that stores data 548, at least one computer program (PROG) 550, or other set of executable instructions, a computer or at least one data processor (DP) 546, and communication means such as at least one transmitter (TX) 542, and a receiver (RX) 544, that may carry communications with the mobile terminal 520 through one or more antennas 552, for example two antennas as shown in FIG. 5, for bidirectional wireless communications. The access node 2 (560) may have the same type of components, structure and functions as the neighboring access node 1 (540). The access nodes may be in any wireless network such as LTE, LTE-A, GSM, GERAN, WCDMA, CDMA, Wireless LAN, 5G and the like.

The network controller includes MME/s-GW 580, which may be consisted of at least one data processor (DP) 586, and at least one computer-readable memory medium embodied as at least one memory (MEM) 588 that stores data 582 and at least one computer program (PROG) 584. MME/s-GW 580 may be comprised in a single, or a plurality of interconnected devices.

At least one of the PROGs 530, 550, 570 and 584 includes a set of program instructions which enable the device to operate in accordance with the disclosed exemplary embodiments, when executed by the associated DP. Various exemplary embodiments may be implemented at least in part by computer software executed by the DP 526 of the mobile terminal 520, the DP 546 of the access node 1 540, the DP 566 of the access node 2 560, and/or the DP 586 of the MME/s-GW 580, or by hardware, or by a combination of software and hardware. The mobile terminal 520 also may store software 530 in the MEM 538 to implement certain exemplary embodiments of this invention. Thus, the exemplary embodiments of this invention may be implemented at least in part by computer software stored on MEMs, which are executed by the DP 526 of the mobile terminal 520, by the DP 546 of the access node 1 540, and/or by the DP 566 of the access node 2 560, and/or by the DP 586 of the MME/sGW 580, or by hardware, or by a combination of stored software and hardware and/or firmware. Electronic devices implementing these aspects of the invention need not be the entire devices as depicted in FIGS. 1 to 5. Instead, they may be one or more components of same such as the above described stored software, hardware, firmware and DP, or a system on a chip, SoC, or an application specific integrated circuit, ASIC.

Data processors 526, 546, 566 and 586 may comprise, for example, at least one of a microprocessor, application-specific integrated chip, ASIC, field-programmable gate array, FPGA, and a microcontroller. They may also comprise at least one, and in some embodiments more than one, processing core. Memory 538, 558, 578 and 588 may comprise, for example, at least one of magnetic, optical and holographic or other kind or kinds of memory. At least part of memory 538, 558, 578 and 588 may be comprised in data processor 526, 546, 566 and 586. At least part of memory 538, 558, 578 and 588 may be comprised externally to data processor 526, 546, 566 and 586.

The various embodiment of the mobile terminal 520 can include, but are not limited to personal portable digital devices having wireless communication capabilities, including but not limited to wireless handsets, cellular telephones, navigation devices, laptop/palmtop/tablet computers, digital cameras and music devices, and Internet appliances.

Various embodiments of the computer readable MEMs 538, 558, 578 and 588 include any data storage technology type which is suitable to the local technical environment, which includes but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 526, 546, 566 and 586 include but are not limited to general purpose computers, special purpose computers, microprocessors, digital signal processors, DSPs, and multi-core processors.

In general, each of the eNB1, eNB2 and MME/s-GW may comprise means for performing a method of postponing or delaying an initiation of a path switch from a source eNB to a target eNB until at least event or condition is met in accordance with any embodiment as generally disclosed.

As is detailed above, in one embodiment an apparatus comprising means for determining that a path switch can be initiated during a handover of a user equipment from a first access node to a second access node, means for determining at least one condition for initiating the path switch, means for postponing the initiation of the path switch until the at least condition has been met, and means for indicating the initiation of the path switch to the first access node or the second access node in response to determining that the at least one condition has been met.

In a further exemplary embodiment, an apparatus comprising means for determining that a path switch can be initiated during a handover of a user equipment from a first access node to a second access node, means for determining at least one condition for initiating the path switch, means for postponing the initiation of the path switch until the at least one condition has been met, and means for indicating the initiation of the path switch to the first access node or the second access node in response to determining that the at least one condition has been met. The at least one condition comprises at least one of an empty buffer for the user equipment, a congested interface between the first access node and the second access node, a congested interface between one of the first or second access node and one of a mobility management entity or serving gateway, an expiry of a path switch postponement timer, a processing limitation at the first access node, and a condition requiring handover from the second access node to a third access node. The postponement timer of the path switch is equal to a predefined value depending on at least one of a channel measurement and a channel frequency. The condition of empty buffer for the user equipment is met when data buffered for the user equipment at the first access node or at a serving gateway is depleted. The condition of congested interface is met when the interface is determined to approach or reach a capacity limit of a defined value or is within a defined margin of the capacity limit.

In another exemplary embodiment, an apparatus comprising means for determining that a path switch can be initiated, during a handover of a user equipment from a first access node to a second access node, means for determining at least one condition for initiating the path switch, means for postponing the initiation of the path switch until the at least one condition has been met, means for indicating the initiation of the path switch to the first access node or the second access node in response to determining that the at least one condition has been met, and means for maintaining at least one of a connection between the first access node and a mobility management entity or a connection between the first access node and a serving gateway at least until the at least one condition is met.

In another exemplary embodiment, an apparatus comprising means for determining that a path switch can be initiated during a handover of a user equipment from a first access node to a second access node, means for determining at least one condition for initiating the path switch, means for postponing the initiation of the path switch until the at least one condition has been met, means for indicating the initiation of the path switch to the first access node or the second access node in response to determining that the at least one condition has been met, and means for transmitting or receiving the at least condition from the first access node or the second access node.

In another exemplary embodiment, an apparatus comprising means for determining that a path switch can be initiated during a handover of a user equipment from a first access node to a second access node, means for determining at least one condition for initiating the path switch, means for postponing the initiation of the path switch until the at least one condition has been met, means for indicating the initiation of the path switch to the first access node or the second access node in response to determining that the at least one condition has been met. The apparatus may be one of: wherein the apparatus is or is comprised in the first access node and further comprises means for starting a path switch postponement timer in response to receiving a handover preparation confirmation message; wherein the apparatus is or is comprised in the second access node and further comprises means for starting a path switch postponement timer in response to sending a handover preparation confirmation message; wherein the apparatus is or is comprised in a mobility management entity and further comprises means for starting a path switch postponement timer in response to receiving a path switch request message; and, wherein the apparatus is or is comprised in a serving gateway and further comprises means for starting a path switch postponement timer in response to receiving a modify bearer request message.

In another exemplary embodiment, an apparatus comprising at least one processor and at least one memory including computer program code, wherein the at least one memory and the computer program code are configured, with the at least one processor, to cause said apparatus to determine that a path switch can be initiated during a handover of a user equipment from a first access node to a second access node, determine at least one condition for initiating the path switch, postpone the initiation of the path switch until the at least one condition has been met, and in response to determining that the at least one condition has been met, indicate the initiation of the path switch to the first access node or the second access node.

In another exemplary embodiment, an apparatus comprising at least one processor and at least one memory including computer program code, wherein the at least one memory and the computer program code are configured, with the at least one processor, to cause said apparatus to to determine that a path switch can be initiated, during a handover of a user equipment from a first access node to a second access node, determine at least one condition for initiating the path switch, postpone the initiation of the path switch until the at least one condition has been met, and in response to determining that the at least one condition has been met, indicate the initiation of the path switch to the first access node or the second access node. The at least one condition comprises at least one of an empty buffer for the user equipment, a congested interface between the first access node and the second access node, a congested interface between one of the first or second access node and one of a mobility management entity or serving gateway, an expiry of a path switch postponement timer, a processing limitation at the first access node, and a condition requiring handover from the second access node to a third access node. The postponement timer of the path switch is equal to a predefined value depending on at least one of a channel measurement and a channel frequency. The condition of empty buffer for the user equipment is met when data buffered for the user equipment at the first access node or at a serving gateway is depleted. The condition of congested interface is met when the interface is determined to approach or reach a capacity limit of a defined value or is within a defined margin of the capacity limit.

In another aspect thereof an exemplary embodiment provides an apparatus comprising at least one processor and at least one memory including computer program code, wherein the at least one memory and the computer program code are configured, with the at least one processor, to cause said apparatus to determine that a path switch can be initiated during a handover of a user equipment from a first access node to a second access node, determine at least one condition for initiating the path switch, postpone the initiation of the path switch until the at least one condition has been met, indicate the initiation of the path switch to the first access node or the second access node in response to determining that the at least one condition has been met, and maintain at least one of a connection between the first access node and a mobility management entity or a connection between the first access node and a serving gateway at least until the at least one condition is met.

In further aspect thereof an exemplary embodiment provides an apparatus comprising at least one processor and at least one memory including computer program code, wherein the at least one memory and the computer program code are configured, with the at least one processor, to cause said apparatus to determine that a path switch can be initiated during a handover of a user equipment from a first access node to a second access node, determine at least one condition for initiating the path switch, postpone the initiation of the path switch until the at least one condition has been met, indicate the initiation of the path switch to the first access node or the second access node in response to determining that the at least one condition has been met, and transmit or receive the at least condition from the first access node or the second access node.

In further aspect thereof an exemplary embodiment provides an apparatus comprising at least one processor and at least one memory including computer program code, wherein the at least one memory and the computer program code are configured, with the at least one processor, to cause said apparatus to determine that a path switch can be initiated during a handover of a user equipment from a first access node to a second access node, determine at least one condition for initiating the path switch, postpone the initiation of the path switch until the at least one condition has been met, indicate the initiation of the path switch to the first access node or the second access node in response to determining that the at least one condition has been met. The apparatus comprises the first access node, or the second access node, or a network node, or a mobility management entity or a serving gateway.

In further aspect thereof an exemplary embodiment provides an apparatus comprising at least one processor and at least one memory including computer program code, wherein the at least one memory and the computer program code are configured, with the at least one processor, to cause said apparatus to determine that a path switch can be initiated during a handover of a user equipment from a first access node to a second access node, determine at least one condition for initiating the path switch, postpone the initiation of the path switch until the at least one condition has been met, indicate the initiation of the path switch to the first access node or the second access node in response to determining that the at least one condition has been met. The apparatus may be one of: wherein the apparatus is or is comprised in the first access node and wherein said at least one memory and said computer program code further configured, with said at least one processor, to cause said apparatus to start a path switch postponement timer in response to receiving a handover preparation confirmation message; wherein the apparatus is or is comprised in the second access node and wherein said at least one memory and said computer program code further configured, with said at least one processor, to cause said apparatus to start a path switch postponement timer in response to sending a handover preparation confirmation message; wherein the apparatus is or is comprised in a mobility management entity wherein said at least one memory and said computer program code further configured, with said at least one processor, to cause said apparatus to start a path switch postponement timer in response to receiving a path switch request message; and, wherein the apparatus is or is comprised in a serving gateway wherein said at least one memory and said computer program code further configured, with said at least one processor, to cause said apparatus to start a path switch postponement timer in response to receiving a modify bearer request message.

In another aspect thereof an exemplary embodiment provides a method comprising determining, by a network node, during a handover of a user equipment from a first access node to a second access node, that a path switch can be initiated, determining at least one condition for initiating the path switch, postponing the initiation of the path switch until the at least one condition has been met, and in response to determining that the at least one condition has been met, indicating the initiation of the path switch to the first access node or the second access node.

In another aspect thereof an exemplary embodiment provides a computer readable medium tangibly encoded with a computer program executable by a processor to perform actions comprising determining that a path switch can be initiated during a handover of a user equipment from a first access node to a second access node, determining at least one condition for initiating the path switch, postponing the initiation of the path switch until the at least one condition has been met and indicating the initiation of the path switch to the first access node or the second access node in response to determining that the at least one condition has been met.

It should be appreciated that the practice of the invention is not limited to the exemplary embodiments discussed here. Various modifications and adaptations to the foregoing exemplary embodiments of this invention may become apparent to those skilled in the arts in view of the foregoing description. Furthermore, some of the various features of the above non-limiting embodiments may be used to advantage without the corresponding use of other described features.

The foregoing description should therefore be considered as merely illustrative of the principles, teaching and exemplary embodiments of the present invention, and not in limitation thereof.

What is claimed is:

1. An apparatus comprising:
    at least one processor; and
    at least one memory including computer program code, said at least one memory and said computer program code being configured, with said at least one processor, to cause said apparatus at least to:
    determine, during a handover of a user equipment from a first access node to a second access node, that a path switch can be initiated;
    determine at least one condition for initiating the path switch;
    postpone the initiation of the path switch until the at least one condition has been met;
    in response to determining that the at least one condition has been met, indicate the initiation of the path switch to the second access node; and
    maintain a connection between the first access node and a mobility management entity or a connection between the first access node and a serving gateway at least until the at least one condition is met,
    wherein the at least one condition comprises at least one of:
    an empty buffer for the user equipment,
    a congested interface between the first access node and the second access node,
    a congested interface between one of the first or the second access node and one of a mobility management entity or a serving gateway,
    an expiry of a path switch postponement timer set to a value dependent on one of channel measurements or channel frequency,
    a processing limitation at the first access node, or
    a condition requiring a handover from the second access node to a third access node, and
    wherein the apparatus comprises the first access node.

2. The apparatus as in claim 1, wherein a postponement timer of the path switch is equal to a predefined value depending on at least one of a channel measurement and a channel frequency.

3. The apparatus as in claim 1, wherein the condition of empty buffer for the user equipment is met when data buffered for the user equipment at the first access node or at a serving gateway is depleted.

4. The apparatus as in claim 1, wherein the condition of congested interface is met when the interface is determined to approach or reach a capacity limit of a defined value or is within a defined margin of the capacity limit.

5. The apparatus as in claim 1, wherein said at least one memory and said computer program code are further configured, with said at least one processor, to cause said apparatus to transmit or receive the at least condition from the first access node or the second access node.

6. The apparatus as in claim 1, wherein the apparatus is or is comprised in one of:
    the first access node and wherein said at least one memory and said computer program code are further configured, with said at least one processor, to cause said apparatus to start a path switch postponement timer in response to receiving a handover preparation confirmation message;
    the second access node and wherein said at least one memory and said computer program code are further configured, with said at least one processor, to cause said apparatus to start a path switch postponement timer in response to sending a handover preparation confirmation message;
    a mobility management entity and wherein said at least one memory and said computer program code are further configured, with said at least one processor, to cause said apparatus to start a path switch postponement timer in response to receiving a path switch request message; or
    a serving gateway and wherein said at least one memory and said computer program code are further configured, with said at least one processor, to cause said apparatus to start a path switch postponement timer in response to receiving a modify bearer request message.

7. A method comprising:
    determining, during a handover of a user equipment from a first access node to a second access node, that a path switch can be initiated;
    determining at least one condition for initiating the path switch;
    postponing the initiation of the path switch until the at least one condition has been met;
    in response to determining that the at least one condition has been met, indicating the initiation of the path switch to the second access node; and
    maintaining a connection between the first access node and a mobility management entity or a connection between the first access node and a serving gateway at least until the at least one condition is met,
    wherein the at least one condition comprises at least one of:
    an empty buffer for the user equipment,
    a congested interface between the first access node and the second access node,
    a congested interface between one of the first or the second access node and one of the mobility management entity or the serving gateway,
    an expiry of a path switch postponement timer set to a value dependent on one of channel measurements or channel frequency,
    a processing limitation at the first access node, or
    a condition requiring a handover from the second access node to a third access node, wherein the method is performed by a network node, the network node comprising the first access node.

8. The method as in of claim 7, wherein a postponement timer of the path switch is equal to a predefined value depending on at least one of a channel measurement and a channel frequency.

9. The method as in claim 7, wherein the condition of empty buffer for the user equipment is met when data buffered for the user equipment at the first access node or at the serving gateway is depleted.

10. The method as in claim 7, wherein the condition of congested interface is met when the interface is determined to approach or reach a capacity limit of a defined value or is within a defined margin of the capacity limit.

11. The method as in claim 7, further comprising transmitting or receiving the at least one condition from the first access node or the second access node.

12. The method as in claim 7, wherein the network node being one of:
    the first access node and further comprising starting a path switch postponement timer in response to receiving a handover preparation confirmation message;
    the second access node and further comprising starting a path switch postponement timer in response to sending a handover preparation confirmation message;
    a mobility management entity and further comprising starting a path switch postponement timer in response to receiving a path switch request message; or
    a serving gateway and further comprising starting a path switch postponement timer in response to receiving a modify bearer request message.

13. A non-transitory computer readable medium tangibly encoded with a computer program executable by a processor to perform actions comprising:

determining, during a handover of a user equipment from a first access node to a second access node, that a path switch can be initiated;

determining at least one condition for initiating the path switch;

postponing the initiation of the path switch until the at least one condition has been met;

in response to determining that the at least one condition has been met, indicating the initiation of the path switch to the second access node; and maintaining a connection between the first access node and a mobility management entity or a connection between the first access node and a serving gateway at least until the at least one condition is met, wherein the at least one condition comprises at least one of:

an empty buffer for the user equipment, a congested interface between the first access node and the second access node, a congested interface between one of the first or the second access node and one of the mobility management entity or the serving gateway, an expiry of a path switch postponement timer set to a value dependent on one of channel measurements or channel frequency, a processing limitation at the first access node, or a condition requiring a handover from the second access node to a third access node, wherein the method is performed by a network node, the network node comprising the first access node.

* * * * *